(12) United States Patent
Yoneyama et al.

(10) Patent No.: US 9,458,340 B2
(45) Date of Patent: Oct. 4, 2016

(54) AQUEOUS INK, RECORDING APPARATUS AND RECORDING METHOD

(71) Applicant: FUJI XEROX CO., LTD., Tokyo (JP)

(72) Inventors: Hirohito Yoneyama, Kanagawa (JP); Mami Hatanaka, Kanagawa (JP); Hiroyuki Ueki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/810,777

(22) Filed: Jul. 28, 2015

(65) Prior Publication Data

US 2016/0222240 A1 Aug. 4, 2016

(30) Foreign Application Priority Data

Feb. 2, 2015 (JP) ................. 2015-018493

(51) Int. Cl.
| | |
|---|---|
| B41J 2/15 | (2006.01) |
| C09D 11/52 | (2014.01) |
| C09D 11/107 | (2014.01) |
| C09D 11/102 | (2014.01) |
| C09D 11/104 | (2014.01) |
| C09D 11/033 | (2014.01) |

(52) U.S. Cl.
CPC ............ *C09D 11/52* (2013.01); *C09D 11/033* (2013.01); *C09D 11/102* (2013.01); *C09D 11/104* (2013.01); *C09D 11/107* (2013.01)

(58) Field of Classification Search
CPC .......... B41J 2/01; C09D 11/40; C09D 11/30; C09D 11/00; C09D 11/033
See application file for complete search history.

(56) References Cited

U.S. PATENT DOCUMENTS

| | | | | |
|---|---|---|---|---|
| 6,958,090 B2* | 10/2005 | Redfearn | ............... | C09D 11/32 106/31.6 |
| 7,918,552 B2* | 4/2011 | Ageishi | ................. | B41J 11/007 347/103 |
| 2008/0018707 A1 | 1/2008 | Masuyama et al. | | |

FOREIGN PATENT DOCUMENTS

JP 2006-175743 7/2006

\* cited by examiner

*Primary Examiner* — Lamson Nguyen
(74) *Attorney, Agent, or Firm* — Fildes & Outland, P.C.

(57) ABSTRACT

There is provided an aqueous ink which contains a coloring agent, a polymer particle, water and an aqueous organic solvent, and a surface resistivity of a film obtained by film formation on a glass plate is $1 \times 10^6$ $\Omega/\square$ or less, and a recording method containing: a first discharge step that discharges the first aqueous ink on a front surface of a recording medium; a first drying step that dries the first aqueous ink discharged on the front surface of the recording medium after the first discharge step; and a second discharge step that discharges a second aqueous ink on a rear surface of the recording medium after the first drying step.

5 Claims, 1 Drawing Sheet

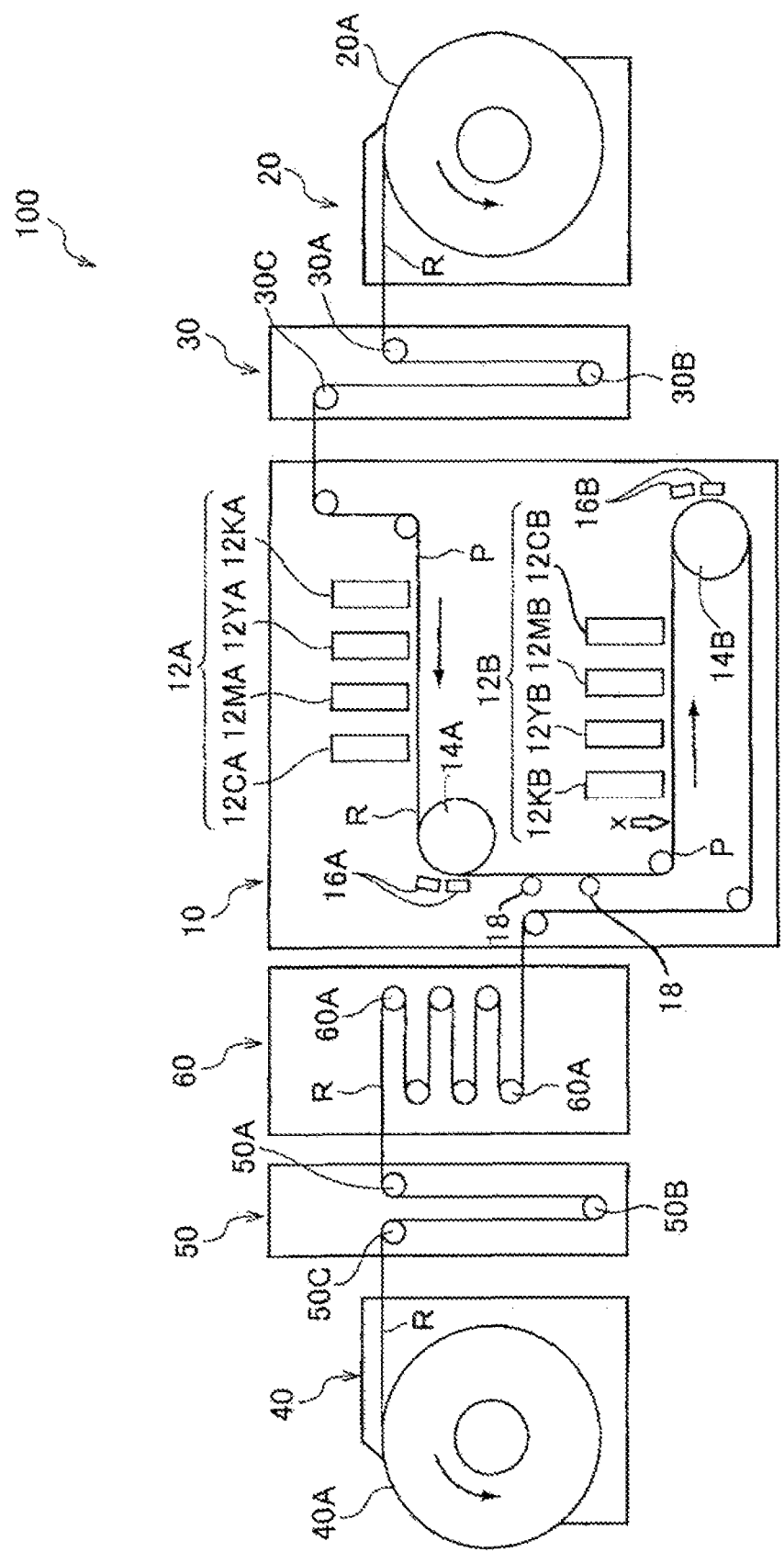

AQUEOUS INK, RECORDING APPARATUS AND RECORDING METHOD

CROSS-REFERENCE TO RELATED APPLICATIONS

This application is based on and claims priority under 35 USC 119 from Japanese Patent Application No. 2015-018493 filed on Feb. 2, 2015.

BACKGROUND

1. Field

The present invention relates to an aqueous ink, a recording device and a recording method.

2. Description of the Related Art

In the case of performing recording by an inkjet recording method, an ink droplet which has been one ink droplet immediately after discharging ink is broken into a plurality of ink droplets to may generate fine ink droplets called satellites. It is also known that mist which is formed by further distribution of the satellite adheres to a discharge head which discharges ink to may disturb ink discharge.

Thus, a recording apparatus equipped with a unit for collecting the mist generated is proposed.

SUMMARY

[1] An aqueous ink which contains:
a coloring agent,
a polymer particle,
water, and an aqueous organic solvent,
wherein a surface resistivity of a film obtained by film formation on a glass plate is $1 \times 10^6$ $\Omega/\square$ or less.

BRIEF DESCRIPTION OF DRAWINGS

FIGURE is a schematic configuration drawing showing a recording apparatus relating to the present exemplary embodiment.

DESCRIPTION OF REFERENCE NUMERALS AND SIGNS

10: Image-recording unit
12A, 12KA, 12YA, 12MA, 12CA: (First) discharge head
12B, 12KB, 12YB, 12MB, 12CB: (Second) discharge head
14A: Drying drum (first drying device)
14B: Drying drum (second drying device)
16A: Warm air blowing device (first drying device)
16B: Warm air blowing device (first drying device)
20: Pre-treatment unit
20A: Supply roll
30: Buffer unit
30A: First pass roller
30B: Dancer roller
30C: Second pass roller
40: Post-treatment unit
40A: Winding roll
50: Buffer unit
50A: First pass roller
50B: Dancer roller
50C: Second pass roller
60: Cooling unit
60A: Cooling roller
100: Recording apparatus
P: Recording medium
R: Convey route

DETAILED DESCRIPTION

Hereinafter, the aqueous ink, recording apparatus and recording method according to the invention will be described in detail based on an exemplary embodiment which is one example according to the invention.

The aqueous ink relating to the exemplary embodiment is an aqueous ink which contains a coloring agent, a polymer particle, water and an aqueous organic solvent, and a surface resistivity of a film obtained by film formation on a glass plate is $1 \times 10^6$ $\Omega/\square$ or less.

The term "film formation on a glass plate" (film is formed on a glass plate) as used herein indicates a state shown below.

Using 2 g of the aqueous ink which is a measurement sample, when it is coated on the whole surface of a 5 cm×5 cm glass plate (produced by Matsunami Glass Ind., Ltd.), a state in which a film composed on the aqueous ink is formed on the whole surface of the glass plate without exposing a part of a surface of the glass plate is called "film formation on a glass plate".

The film formation is performed under conditions of temperature of 23° C. and humidity of 30% RH.

In the exemplary embodiment, the surface resistivity of the film obtained as described above is $1 \times 10^6$ $\Omega/\square$ or less (preferably $8 \times 10^5$ $\Omega/\square$ or less, and more preferably $6 \times 10^5$ $\Omega/\square$ or less).

By being such surface resistivity of the film, mist generated when images are recorded on both surfaces of a recording medium is reduced.

The surface resistivity of the film is able to adjust according to the kind and content of the polymer particle (kind of a polymer compound (an acid value, a dopant or the like) constituting the polymer particle), the kind and content of a moisturizing agent (a polyhydric alcohol), the kind and content of a high boiling point solvent or the like, and it is preferred to adjust according to the kind and content of the polymer particle from the standpoint of fixability.

The surface resistivity of the film formed is measured in the manner described below.

A film formed on a glass plate is placed on a measurement stage (MCP-ST01 produced by Mitsubishi Chemical Corp.). Then, a measurement probe (HR Probe produced by Mitsubishi Chemical Corp.) is brought into close contact with the film formed and surface resistivity is measured by a high resistivity meter (Hiresta IP produced by Mitsubishi Chemical Corp.).

According to the aqueous ink relating to the exemplary embodiment, mist generated when images are recorded on both surfaces of a recording medium is reduced. In the description below, to record images on both surfaces of a recording medium is called "both surface printing".

The reason for achieving the effect as above is assumed as follows.

In the inkjet recording method, as a recording medium which is an object to which aqueous ink is to be discharged, a recording media which is hardly penetrated by the aqueous ink, has a coating layer provided on one surface or both surfaces of a paper substrate and is called coated paper is known.

For the image formation by the aqueous ink on such a coated paper, it is preferred to perform fixation of image by being subjected to evaporative drying using heat in addition to permeation drying of the aqueous ink.

Also, the recording medium to which the aqueous ink is discharged is itself also dried by the evaporative drying for the aqueous ink so that it becomes easily charged by friction with a conveying unit, for example, a conveying roll. In particularly, the coated paper has a characteristic of being more easily charged due to the presence of the coated layer.

In the case of performing the both surface printing using an aqueous ink by an inkjet recording method, after conducting image recording through the discharge of aqueous ink on a front surface of recording medium and the permeation drying and evaporative drying, the discharge of aqueous ink on a rear surface of recording medium is conducted. Specifically, when the discharge of aqueous ink on a rear surface of recording medium is conducted, the recording medium is in a state of being electrostatically charged because of conducting the image formation on the front surface and the evaporative drying. When aqueous ink is discharged on the electrostatically charged recording medium, in fine ink droplets called satellites the electric charges repel each other to cause further distribution so that the generation of mist which is a fine droplet of the aqueous ink may be encouraged.

Also, since the mist generated has electrically the same polarity as the recording medium, it adheres not to the recording medium but to the discharge head to may disturb ink discharge.

The aqueous ink relating to the exemplary embodiment contains a polymer particle, and a surface resistivity of a film obtained by film formation on a glass plate is $1 \times 10^6$ Ω/□ or less.

It is assumed that by drying and fixing the aqueous ink having such a constitution, the image exhibiting conductivity is obtained. Thus, in the case of both surface printing when the image is formed using the aqueous ink relating to the exemplary embodiment, before the discharge of aqueous ink on a rear surface of recording medium is conducted, the image recorded on the front surface of recording medium is contact with a conveying unit, for example, a conveying roll, thereby conducting static electricity removal of the recording medium through the image on the surface of recording medium. By the static electricity removal of the recording medium, when the aqueous ink is discharged on the rear surface of recording medium, the surface electric potential of the rear surface of recording medium is reduced so that even when the aqueous ink is discharged on the rear surface of recording medium, the generation of mist is able to be inhibited.

From the above it is assumed that according to the aqueous ink relating to the exemplary embodiment, the mist generated when the both surface printing is performed is reduced.

[Aqueous Ink]

Hereinafter, the aqueous ink relating to the exemplary embodiment will be described.

The aqueous ink, relating to the exemplary embodiment contains a coloring agent, a polymer particle, water and an aqueous organic solvent.

(Coloring Agent)

First, the coloring agent is described.

As the coloring agent, a coloring agent responding to the aqueous ink having a desired hue may be used, and specifically, a pigment is exemplified. As the pigment, an organic pigment and an inorganic pigment are exemplified.

Specific examples of black color pigment (black pigment) include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080 and Raven 1060 (all produced by Columbian Carbon Co.), Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (all produced by Cabot Corp.), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (all produced by Orion Engineered Carbons), No. 25, No. 33, No. 40, No. 47, No. 52, No. 900, No. 2300, MCF-88, MA600, MA7, MA8, and MA100 (all produced by Mitsubishi Chemical Corp.) and the like, but it should not be construed as being limited thereto.

Specific examples of cyan color pigment include C. I. Pigment Blue 1, 2, 3, 15, 15:1, 15:2, 15:3, 15:4, 16, 22 and 60 and the like, but it should not be construed as being limited thereto.

Specific examples of magenta color pigment include C. I. Pigment Red 5, 7, 12, 48, 48:1, 57, 112, 122, 123, 146, 168, 177, 184 and 202, C. I. Pigment Violet 19 and the like, but it should not be construed as being limited thereto.

Specific examples of yellow color pigment include C. I. Pigment Yellow 1, 2, 3, 12, 13, 14, 16, 17, 73, 74, 75, 83, 93, 95, 97, 98, 114, 128, 129, 138, 151, 154 and 180 and the like, but it should not be construed as being limited thereto.

In the case of using the pigment as the coloring agent, it is preferred to use a pigment dispersant in combination. As the pigment dispersant used, a polymer dispersant, an anionic surfactant, a cationic surfactant, an amphoteric surfactant, a nonionic surfactant and the like are exemplified.

As the polymer dispersant, a polymer having a hydrophilic structural portion and a hydrophobic structural portion is preferably used. As the polymer having a hydrophilic structural portion and a hydrophobic structural portion, for example, a condensation polymer and an addition polymer are used. As the condensation polymer, a known polyester dispersant is exemplified. As the addition polymer, an addition polymer of a monomer having an α,β-ethylenically unsaturated group is exemplified. A desired polymer dispersant is obtained by copolymerizing a combination of a monomer having a hydrophilic group and an α,β-ethylenically unsaturated group and a monomer having a hydrophobic group and an α,β-ethylenically unsaturated group. Also, a homopolymer of a monomer having a hydrophilic group and an α,β-ethylenically unsaturated group is used.

As the monomer having a hydrophilic group and an α,β-ethylenically unsaturated group, a monomer having a carboxyl group, a sulfonic acid group, a hydroxy group, a phosphoric acid group or the like, for example, acrylic acid, methacrylic acid, crotonic acid, itaconic acid, an itaconic acid monoester, maleic acid, a maleic monoester, fumaric acid, a fumaric acid monoester, vinylsulfonic acid, styrenesulfonic acid, a sulfonated vinylnaphthalene, vinyl alcohol, acrylamide, methacryloxyethyl phosphate, bismethacryloxyethyl phosphate, methacryloxyethylphenyl acid phosphate, ethylene glycol dimethacrylate, diethylene glycol dimethacrylate and the like are exemplified.

As the monomer having a hydrophobic group and an α,β-ethylenically unsaturated group, a styrene derivative, for example, styrene, α-methylstyrene or vinyltoluene, vinylcyclohexane, vinylnaphthalene, a vinylnaphthalene derivative, an acrylic alkyl ester, a methacrylic alkyl ester, phenyl methacrylate, a methacrylic cycloalkyl ester, a crotonic alkyl ester, an itaconic dialkyl ester, maleic dialkyl ester and the like are exemplified.

Examples of the copolymer preferably used as the polymer dispersant include a styrene-styrenesulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an acrylic alkyl ester-acrylic acid copolymer, a methacrylic alkyl ester-methacrylic acid copolymer, a styrene-methacrylic alkyl ester-methacrylic acid copolymer, a styrene-acrylic alkyl ester-acrylic acid copolymer, a styrene-phenyl methacrylate-methacrylic acid copolymer, a styrene-cyclohexyl methacrylate-methacrylic acid copolymer, and salts thereof. Further, a monomer having a polyoxyethylene group or a hydroxy group may also be copolymerized with these polymers.

The weight average molecular weight of the polymer dispersant is preferably, for example, from 2,000 to 50,000.

The pigment dispersants may be used individually or in combination of two or more thereof. The content of the polymer dispersant significantly varies according to the pigment and cannot be described generally, but is preferably from 0.1 mass % to 100 mass %.

As the pigment, a pigment which is self-dispersed in water (hereinafter, referred to as a self-dispersing pigment) is exemplified.

The self-dispersing pigment indicates a pigment which has a water-solubilizing group on the surface thereof and is dispersed in water even in the absence of a polymer dispersant. The self-dispersing pigment is obtained, for example, by subjecting pigment to a surface modification treatment, for example, an acid/base treatment, a coupling agent treatment, a polymer graft treatment, a plasma treatment or an oxidation/reduction treatment.

As the self-dispersing pigment, in addition to pigments obtained by subjecting the pigments to the surface modification treatment described above, commercially available self-dispersing pigments, for example, Cab-o-jet 200, Cab-o-jet 300, Cab-o-jet 400, IJX-157, IJX-253, IJX-266, IJX-273, IJX-444, IJX-55, Cab-o-jet 250C, Cab-o-jet 260M, Cab-o-jet 270Y, Cab-o-jet 450C, Cab-o-jet 465M, Cab-o-jet 470Y and Cab-o-jet 480M produced by Cabot Corp., and Microjet Black CW-1 and CW-2 produced by Orient Chemical Industries, Co., Ltd. are exemplified.

The self-dispersing pigment is preferably a pigment having on its surface as a functional group, at least sulfonic acid, sulfonate, carboxylic acid or carboxylate. It is more preferably a pigment having on its surface as a functional group, at least carboxylic acid or carboxylate.

Here, as the pigment, a pigment coated with a resin is exemplified. This is called a microcapsule pigment, and commercially available microcapsule pigments produced by DIC Corp., Toyo Ink Co., Ltd. or the like are known. Not only the commercially available microcapsule pigment, but also a microcapsule pigment produced depending on the purpose may also be used.

Also, as the pigment, a resin dispersion pigment in which a polymer compound is physically adsorbed or chemically bonded to pigment is exemplified.

Also, as the pigment, as well as pigments of black color and three primary colors of cyan, magenta and yellow, specific color pigment of red, green, blue, brown, white or the like, metallic luster pigment of gold color, silver color or the like, colorless or hypochromic extender pigment, and a plastic pigment are exemplified.

Also, as the pigment, particle in which a dye or pigment is fixed on a surface of core, for example, silica, alumina or polymer bead, insoluble lake dye, colored emulsion, colored latex and the like are exemplified.

As the coloring agent, besides the pigment, a dye, for example, a hydrophilic anionic dye, a direct dye, a cationic dye, a reactive dye, a polymer dye or an oil soluble dye, wax powder, resin powder and emulsion each of which is colored with a dye, a fluorescent dye, a fluorescent pigment and the like are exemplified.

The volume average particle diameter of the coloring agent is, for example, from 10 nm to 1,000 nm.

The volume average particle diameter of the coloring agent denotes a particle diameter of the coloring agent itself, or in the case where an additive, for example, a dispersant is adhered to the coloring agent, it denotes a particle diameter of the pigment adhered with the additive.

The measurement of the volume average particle diameter is conducted by Microtrack UPA Particle Size Analyzer UPA-UT151 (produced by Microtrack Inc.). The measurement is conducted by putting the aqueous ink diluted 1,000 times into a measurement cell. As to the input values, as viscosity, viscosity of the diluted solution of aqueous ink, and as particle refractive index, refractive index of the coloring agent are employed, respectively.

The content (concentration) of the coloring agent is, for example, preferably from 1 mass % to 25 mass %, and more preferably from 2 mass % to 20 mass %.

(Polymer Particle)

The polymer particle is described.

The polymer particle is a component for enhancing fixability of the image due to the aqueous ink to a recording medium.

The polymer particle in the exemplary embodiment is a granulated polymer compound and is a different component from the polymer dispersant described above.

As the polymer particle, for example, a particle (latex particle) of a styrene-acrylic acid copolymer, a styrene-acrylic acid-sodium acrylate copolymer, a styrene-butadiene copolymer, polystyrene, an acrylonitrile-butadiene copolymer, an acrylate copolymer, polyurethane, polyester, a silicon-acrylic acid copolymer, an acrylic-modified fluorine resin or the like is exemplified.

As the polymer particle, a core-shell type polymer particle different in the composition between the central portion and the peripheral portion of the particle is also exemplified.

In the exemplary embodiment, the polymer particle preferably contains a polymer compound having an acid value of 10 mgKOH/g or more (more preferably an acid value of 40 mgKOH/g or more) from the standpoint of film-forming property on a glass plate and ease of adjusting the surface resistivity of film formed.

The upper limit of the acid value of the polymer compound contained in the polymer particle is preferably 100 mgKOH/g from the standpoint of image quality.

Since such a polymer compound is polymer compound having an acid group, due to the presence of the acid group it easily provides conductivity to the film and image formed.

Here, the acid value of the polymer compound is measured using a neutralization titration method according to JIS K 0070.

Specifically, an appropriate amount of a sample is taken, 100 ml of a solvent (diethyl ether/ethanol mixed solution) and a several drops of an indicator (phenolphthalein solution) are added thereto, and the mixture is sufficiently shaken on a water bath until the sample is completely dissolved. The resulting solution is titrated with a 0.1 mol/l potassium hydroxide ethanol solution, and the point of time when the pale red of the indicator continues for 30 seconds is regarded as the end point. The acid value A is calculated from the following equation. When the acid value is denoted by A, the sample amount is denoted by S (g), the 0.1 mol/l potassium hydroxide ethanol solution used in the titration is denoted by B (ml), and a factor of the 0.1 mol/l potassium hydroxide ethanol solution is denoted by f, the acid value is calculated by the formula A=(B×f×5.611)/S.

In the exemplary embodiment, the polymer particle preferably contains a polymer compound having at least one of a sulfonic acid group and a carboxylic acid group from the standpoint of film-forming property on a glass plate and ease of adjusting the surface resistivity of film formed and in view of satisfying the acid value described above. The polymer compound also easily provides conductivity to the film and image formed due to the presence of the sulfonic acid group and/or carboxylic acid group.

The polymer compound having at least one of a sulfonic acid group and a carboxylic acid group may be a polymer compound obtained by using at least one of a monomer having a sulfonic acid group (—SO$_3$H) and a monomer having a carboxylic acid group (—COOH) or a polymer compound obtained by introducing at least one of a sulfonic acid group and a carboxylic acid group into a polymer compound synthesized.

As such a polymer compound, an acrylic copolymer obtained by using at least one of a monomer having a sulfonic acid group and a monomer having a carboxylic acid group, a polyurethane having at least one of a sulfonic acid group and a carboxylic acid group, a polyester having at least one of a sulfonic acid group and a carboxylic acid group and the like are preferred.

The polymer compound having an acid value of 10 mgKOH/g or more or the polymer compound having at least one of a sulfonic acid group and a carboxylic acid group described above is a polymer compound which is hydrophilic and has a moisture retaining property due to the presence of the functional group (acid group).

By using the polymer particle containing the polymer compound having a moisture retaining property, the polymer particle is able to efficiently supply moisture in the aqueous ink to the recording medium. Therefore, it is believed that drying of the recording medium is inhibited so that the recording medium becomes hardly charged.

Thus, in the case of using the polymer particle containing the polymer compound having a moisture retaining property in the aqueous ink relating to the exemplary embodiment, the content of a polyhydric alcohol, for example, glycerol, propylene glycol or butylene glycol, that is, a so-called moisturizer is able to be reduced. By the reduction of the content of polyhydric alcohol (moisturizer), the fixability of the aqueous ink is enhanced.

In the exemplary embodiment, the polymer compound having an acid value of 10 mgKOH/g or more or the polymer compound having at least one of a sulfonic acid group and a carboxylic acid group is preferably a polyester or a polyurethane for the purpose of increasing the fixability.

That is, a preferred polymer particle in the exemplary embodiment is a polyester or polyurethane having an acid value of 10 mgKOH/g or more, or a polyester or polyurethane having at least one of a sulfonic acid group and a carboxylic acid group.

Here, the polyester and polyurethane in the polymer compound constituting the polymer particle have polyester and polyurethane as the main skeletons, respectively, and may be a modified product or a copolymer containing a partial structure different from the polyester and polyurethane.

The polymer particle may be dispersed in the aqueous ink using an emulsifier or may be dispersed in the aqueous ink without using an emulsifier.

As the emulsifier, a surfactant and a polymer having a hydrophilic group, for example, a sulfonic acid group or a carboxyl group (for example, a polymer in which a hydrophilic group is connected by a graft bond or a polymer obtained from a monomer having hydrophilicity and a monomer having a hydrophobic portion) are exemplified.

The volume average particle diameter of the polymer particle is preferably from 10 nm to 300 nm, and more preferably from 10 nm to 200 nm, from the standpoint of glossiness and abrasion resistance of the image.

The measurement of the volume average particle diameter of the polymer particle is conducted by Microtrack UPA Particle Size Analyzer UPA-UT151 (produced by Microtrack Inc.). The measurement is conducted by putting the aqueous ink diluted 1,000 times into a measurement cell. As to the input values, as viscosity, viscosity of the diluted solution of aqueous ink, and as particle refractive index, refractive index of the polymer are employed, respectively.

The glass transition temperature of the polymer particle is preferably from −20° C. to 80° C., and more preferably from −10° C. to 60° C., from the stand point of abrasion resistance of the image.

The glass transition temperature of the polymer particle is determined from a DSC curve obtained by differential scanning calorimetry (DSC). More specifically, it is determined according to "Extrapolated glass transition initiation temperature" described in the method for determining glass transition temperature of "Testing Methods for Transition Temperatures of Plastics" of JIS K 7121-1987.

The content of the polymer particle is preferably from 0.1 mass % to 10 mass %, more preferably from 0.5 mass % to 5 mass %, relative to the aqueous ink, from the standpoint of enhancement of image fixability, discharge stability and film-forming property.

By setting the content of the polymer particle to 0.1 mass % or more, the film-forming property on a glass plate is easily obtained, and by setting the content of the polymer particle to 10 mass % or less, the surface resistivity of a film formed on a glass plate is easily to be set to $1 \times 10^6$ Ω/□ or less depending on the kind of the polymer particle.

(Water)

The water is described below.

As the water, ion-exchange water, ultrapure water, distilled water or ultrafiltrated water is preferably exemplified, from the standpoint of preventing interfusion of impurities or generation of microorganisms.

The content of the water is, for example, preferably from 10 mass % to 95 mass %, more preferably from 30 mass % to 90 mass %, relative to the aqueous ink.

(Water-Soluble Organic Solvent)

The water-soluble organic solvent is described below.

As the water-soluble organic solvent, a polyhydric alcohol, a polyhydric alcohol derivative, a nitrogen-containing solvent, an alcohol, a sulfur-containing solvent and the like are exemplified. In addition, as the water-soluble organic solvent, propylene carbonate, ethylene carbonate and the like are also exemplified.

As the polyhydric alcohol, ethylene glycol, diethylene glycol, propylene glycol, butylene glycol, triethylene glycol, 1,5-pentanediol, 1,2-hexanediol, 1,2,6-hexanetriol, glycerol and the like are exemplified.

As the polyhydric alcohol derivative, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, an ethylene oxide adduct of diglycerol and the like are exemplified.

As the nitrogen-containing solvent, pyrrolidone, N-methyl-2-pyrrolidone, cyclohexylpyrrolidone, triethanolamine and the like are exemplified.

As the alcohol, ethanol, isopropyl alcohol, butyl alcohol, benzyl alcohol and the like are exemplified.

As the sulfur-containing solvent, thiodiethanol, thiodiglycerol, sulfolane, dimethylsulfoxide and the like are exemplified.

The water-soluble organic solvents may be used individually or in combination of two or more thereof.

The content of the water-soluble organic solvent is preferably from 1 mass % to 60 mass %, more preferably from 1 mass % to 40 mass %, relative to the water.

Of the water-soluble organic solvents, a polyhydric alcohol (moisturizer), for example, glycerol, propylene glycol or butylene glycol, which has the moisture retaining property, is able to adjust the surface resistivity of the film formed on a glass plate, but from the standpoint of fixability, the content thereof is preferably small. In particular, it is preferred that glycerol is not contained or the content thereof is small.

The content of the polyhydric alcohol (moisturizer), for example, glycerol, propylene glycol or butylene glycol is preferably 30 mass % or less, more preferably 20 mass % or less, relative to the aqueous ink.

(Surfactant)

The surfactant is described below.

The aqueous ink, preferably contains as the surfactant, for example, a surfactant having HLB (hydrophilic group/hydrophobic group balance (Hydrophile-Lipophile Balance") of 14 or less. By adjusting the amount of the surfactant having HLB of 14 or less, using plural kinds of surfactants having different HLB values or the like, the surface tension of the aqueous ink is able to be easily controlled.

The HLB (hydrophilic group/hydrophobic group balance "Hydrophile-Lipophile Balance") is defined according to formula (Griffin's method) shown below.

HLB=20×(sum of formula weight of hydrophilic portion/molecular weight)

As such a surfactant, at least one selected from the group consisting of an ethylene oxide adduct of acetylene glycol and a polyether-modified silicone is exemplified.

The ethylene oxide adduct of acetylene glycol is, for example, a compound having —O—(CH$_2$CH$_2$O)$_n$—H (wherein, n represents, for example, an integer from 1 to 30) structure obtained by adding ethylene oxide to at least one hydroxy group of acetylene glycol.

As commercial products of the ethylene oxide adduct of acetylene glycol, for example, OLFINE E 1004 (from 7 to 9), OLFINE E 1010 (from 13 to 14), OLFINE EXP 4001 (from 8 to 11), OLFINE EXP 4123 (from 11 to 14), OLFINE EXP 4300 (from 10 to 13), SURFYNOL 104H (4), SURFYNOL 420 (4), SURFYNOL 440 (4) and DYNOL 604 (8), wherein the numerical value in parentheses indicates a HLB value shown in catalogue (all produced by Nissin Chemical Industry Co., Ltd.) are exemplified.

The polyether-modified silicone is, for example, a compound in which a polyether chain is connected in a graft form to a silicone chain (polysiloxane main chain) or a compound in which a polyether chain is connected in a block form to a silicone chain (polysiloxane main chain). As the polyether group, for example, a polyoxyethylene group, a polyoxypropylene group and the like are exemplified. The polyether group may also be a polyoxyalkylene group in which, for example, an oxyethylene group and an oxypropylene group are added in a block form or at random.

As commercial products of the polyether-modified silicone, for example, SILFACE SAG002 (12), SILFACE SAG503A (11) and SILFACE SAG005 (7), wherein the numerical value in parentheses indicates a HLB value shown in catalogue (all produced by Nissin Chemical industry Co., Ltd.) are exemplified.

In the aqueous ink relating to the exemplary embodiment, a surfactant other than the ethylene oxide adduct of acetylene glycol and the polyether-modified silicone may be used.

As the other surfactant, an anionic surfactant, a nonionic surfactant, a cationic surfactant and an amphoteric surfactant are exemplified, and an anionic surfactant and a nonionic surfactant are preferred.

As the anionic surfactant, an alkylbenzenesulfonate, an alkylphenylsulfonate, an alkylnaphthalenesulfonate, a higher fatty acid salt, a sulfate of a higher fatty acid ester, a sulfonate of a higher fatty acid ester, a sulfate ester or sulfonate of a higher alcohol ether, a higher alkyl sulfosuccinate, polyoxyethylene alkyl ether carboxylate, polyoxyethylene alkyl ether sulfate, alkyl phosphate, polyoxyethylene alkyl ether phosphate and the like are exemplified.

Among them, as the anionic surfactant, dodecylbenzenesulfonate, isopropylnaphthalenesulfonate, monobutylphenylphenol monosulfonate, monobutylbiphenylsulfonate, monobutylbiphenylsulfonate and dibutylphenylphenoldisulfonate are preferred.

As the nonionic surfactant, a polyoxyethylene alkyl ether, a polyoxyethylene alkylphenyl ether, a polyoxyethylene fatty acid ester, a sorbitan fatty acid ester, a polyoxyethylene sorbitan fatty acid ester, a polyoxyethylene sorbitol fatty acid ester, a glycerol fatty acid ester, a polyoxyethylene glycerol fatty acid ester, a polyglycerol fatty acid ester, a sucrose fatty acid ester, a polyoxyethylene alkyl amine, a polyoxyethylene fatty acid amide, an alkylalkanolamide, a polyethylene glycol-polypropylene glycol block copolymer, an acetylene glycol and the like are exemplified.

Among them, as the nonionic surfactant, polyoxyethylene nonyl phenyl ether, polyoxyethylene octyl phenyl ether, polyoxyethylene dodecyl phenyl ether, a polyoxyethylene alkyl ether, a polyoxyethylene fatty acid ester, a sorbitan fatty acid ester, a polyoxyethylene sorbitan fatty acid ester, a fatty acid alkylolamide, a polyethylene glycol-polypropylene glycol block copolymer and acetylene glycol are preferred.

As the nonionic surfactant, in addition, a silicone surfactant, for example, polysiloxane oxyethylene adduct; a fluorine surfactant, for example, a perfluoroalkyl carboxylate, a perfluoroalkyl sulfonate or an oxyethylene perfluoroalkyl ether; a biosurfactant, for example, spiculisporic acid, rhamnolipid or lysolecithin; and the like are exemplified.

The hydrophilicity/hydrophobicity balance (HLB) of the other surfactant is, for example, preferably in the range from 3 to 20 in view of solubility and the like.

The surfactants may be used individually or in combination of two or more thereof.

The content of the surfactant in total is preferably from 0.1 mass % to 10 mass %, more preferably from 0.1 mass % to 5 mass %, still more preferably from 0.2 mass % to 3 mass %, relative to the aqueous ink.

(Other Additive)

Other additive is described below.

The aqueous ink may contain other additive.

As the other additives, an ink discharging property improving agent (for example, polyethyleneimine, an polyamine, polyvinylpyrrolidone, polyethylene glycol, ethyl cellulose or carboxymethyl cellulose), a conductivity/pH adjusting agent (for example, an alkaline metal compound, e.g., potassium hydroxide, sodium hydroxide or lithium hydroxide), a reactive dilution solvent, a penetrating agent, a pH buffer, an antioxidant, a fungicide, a viscosity modifier, a conductive agent, a chelating agent, an ultraviolet absorber, an infrared absorber and the like are exemplified.

(Physical Properties of Aqueous Ink)

Preferable physical properties of the aqueous ink are described below.

The pH of the aqueous ink is preferably in a range from 4 to 10, and more preferably in a range from 5 to 9.

Here, as the pH of the aqueous ink, a value measured by a pH/conductivity meter (MPC 227 produced by Mettler Toledo Inc.) under the conditions of temperature of 23±0.5° C. and humidity of 55±5% RH is used.

The conductivity of the aqueous ink is, for example, in a range from 0.01 S/m to 0.5 S/m (preferably in a range from 0.01 S/m to 0.25 S/m, and more preferably in a range from 0.01 S/m to 0.20 S/m)

The measurement of the conductivity is performed by a pH/conductivity meter (MPC 227 produced by Mettler Toledo Inc.)

The viscosity of the aqueous ink is, for example, in a range from 1.5 mPa.s to 30 mPa.s (preferably in a range from 1.5 mPa.s to 20 mPa.s).

The viscosity is measured using TV-20 (produced by Toki Sangyo Co., Ltd.) as a measuring device under the conditions of measurement temperature of 23° C. and a shear rate of $1,400\ s^{-1}$.

(Use)

Here, the aqueous ink relating to the exemplary embodiment may be, for example, black ink, cyan ink, magenta ink, yellow ink, or an intermediate color ink other than these color inks.

Also, the aqueous ink relating to the exemplary embodiment may be used as an ink set containing at least one of the aqueous inks (preferably an ink set all composed of the aqueous inks relating to the exemplary embodiment).

Since the aqueous ink relating to the exemplary embodiment is able to conduct static electricity removal of the recording medium through the image obtained by the aqueous ink, in the case of the both surface printing by the inkjet recording method it is preferably used in the first time image formation on the surface of recording medium.

Also, since the aqueous ink relating to the exemplary embodiment contains the polymer particle and is excellent in the fixability, in the case of the both surface printing by the inkjet recording method it may be used not only in the first time image formation on the surface of recording medium but also in the second time image formation on the surface of recording medium.

In the specification, as to the recording medium, a surface of the recording medium on which the first image formation is conducted is referred to as "front surface", and after the first image formation, a surface of the recording medium which is a surface opposite to the surface on which the first image formation is conducted and on which the second image formation is conducted is referred to as "rear surface".

Also, in the specification, to discharge the aqueous ink on the recording medium (in the intended region) is also referred to as "image formation" or "to form an image", and to discharge the aqueous ink on the recording medium, followed by drying and fixing is also referred to as "image recording" or "to record an image".

[Recording Apparatus/Recording Method]

Hereinafter, the recording apparatus and recording method using the aqueous ink relating to the exemplary embodiment will be described.

The recording apparatus using the aqueous ink relating to the exemplary embodiment may be a recording apparatus provided with a discharge head for discharging the aqueous ink relating to the exemplary embodiment on a recording medium. By the recording apparatus, a recording method including a discharge step for discharging the aqueous ink relating to the exemplary embodiment on a recording medium is realized.

Also, the recording apparatus may be further provided with a drying device for drying the ink discharged on the recording medium. By the recording apparatus further provided with a drying device, a recording method further including a drying step for drying the ink discharged on the recording medium is realized. According to the drying of the ink discharged on the recording medium by the drying device (drying step), high-speed recording is realized.

Hereinafter, the recording apparatus and recording method for conducting the both surface printing (the recording apparatus and recording method relating to the exemplary embodiment) in which the effect of the aqueous ink relating to the exemplary embodiment is more clearly exhibited will be described.

The recording apparatus relating to the exemplary embodiment is provided with a first discharge head for discharging the aqueous ink relating to the exemplary embodiment as a first aqueous ink on a front surface of a recording medium, a first drying device for drying the first aqueous ink discharged by the first discharge head on the front surface of the recording medium, and a second discharge head for discharging a second aqueous ink on a rear surface of the recording medium after the first aqueous ink has been dried by the first drying device.

According to the recording apparatus, the recording method relating to the exemplary embodiment which includes a first discharge step for discharging the aqueous ink relating to the exemplary embodiment as a first aqueous ink on a front surface of a recording medium, a first drying step for drying the first aqueous ink discharged on the front surface of the recording medium after the first discharge step, and a second discharge step for discharging a second aqueous ink on a rear surface of the recording medium after the first drying step is realized.

Also, the recording apparatus relating to the exemplary embodiment is preferably further provided with a second drying device for drying the second aqueous ink discharged by the second discharge head on the rear surface of the recording medium. According to the recording apparatus further provided with the second drying device, a recording method further including a second drying step for drying the second aqueous ink discharged on the rear surface of the recording medium after the second discharge step is realized. According to the drying of the second aqueous ink discharged on the rear surface of the recording medium by the drying device (drying step), high-speed recording is realized.

Hereinafter, one example of the recording apparatus relating to the exemplary embodiment will be described with reference to the drawing.

FIGURE is a schematic configuration drawing showing a recording apparatus relating to the exemplary embodiment.

The recording apparatus 100 relating to the exemplary embodiment is provided with an image-recording unit 10 for recording an image on a recording medium P, a pre-treatment unit 20 storing the recording medium P which is supplied to the image-recording unit 10, and a buffer unit 30 for controlling a convey amount of the recording medium P supplied from the pre-treatment unit 20 to the image-recording unit 10 and the like. The buffer unit 30 is disposed between the image-recording unit 10 and the pre-treatment unit 20.

Also, the recording apparatus 100 is provided with a post-treatment unit 40 for storing the recording medium P discharged from the image-recording unit 10, and a buffer unit 50 for controlling a convey amount of the recording medium P discharged from the image-recording unit 10 to the post-treatment unit 40 and the like. The buffer unit 50 is disposed between the image-recording unit 10 and the post-treatment unit 40.

Further, the recording apparatus 100 is provided with a cooling unit 60 for cooling the recording medium P discharged from the image-recording unit 10, which is disposed between the image-recording unit 10 and the buffer unit 50.

The image-recording unit 10 is provided, for example, with a roll member (reference numeral omitted) for guiding the recording medium P along a convey route R of recording medium P and a discharge head (first discharge head) 12A discharging the aqueous ink (droplets of the aqueous ink) on a front surface the recording medium P conveyed along the convey route R of recording medium P, and by the discharge head 12A, first image formation is conducted on a front surface of the recording medium P and by the discharge head 12B, second image formation is conducted on a rear surface of the recording medium P after the first image formation.

Each of the discharge heads 12A and 12B is, for example, a long recording head having an effective recording area (arrangement area of nozzles for discharging the aqueous ink) having a length longer than a width (length in the direction crossing with (for example, perpendicular to) the convey direction of the recording medium P) of the recording medium P.

The discharge heads 12A and 12B are not limited to the long recording head, and may be a discharge head having a length shorter than the width of the recording medium P used in a system (a so-called carriage system) of discharging the aqueous ink while moving in the width direction of the recording medium P.

Each of the discharge heads 12A and 12B may be a so-called thermal system in which droplets of aqueous ink are discharged by heat or a so-called piezoelectric system in which droplets of aqueous ink are discharged by pressure, and known discharge heads can be applied.

The discharge heads 12A and 12B have, for example, discharge heads 12KA and 12KB each discharging the aqueous ink on the recording medium P to form an image of K (black) color, discharge heads 12YA and 12YB each discharging the aqueous ink on the recording medium P to form an image of Y (yellow) color, discharge heads 12MA and 12MB each discharging the aqueous ink on the recording medium P to form an image of M (magenta) color, and discharge heads 12CA and 12CB each discharging the aqueous ink on the recording medium P to form an image of C (cyan) color, respectively. The discharge heads 12KA and 12KB, discharge heads 12YA and 12YB, discharge heads 12MA and 12MB, and discharge heads 12CA and 12CB are arranged in this order so as to face the recording medium P from the upstream to the downstream along the convey direction (hereinafter, also simply referred to as a "paper convey direction") of the recording medium P. Here, with respect to the description of the discharge head, in the case where K, Y, M and C are not distinguished, K, Y, M and C attached to the reference numeral are omitted.

The discharge heads 12KA, 12YA, 12MA, 12CA, 12KB, 12YB, 12MB and 12CB are respectively connected to ink cartridges (not shown) of respective colors which are attached to and removed from the recording apparatus 100 through ink supplying tubes (not shown), so that respective color inks are supplied from the ink cartridges to the respective discharge heads 12KA, 12YA, 12MA, 12CA, 12KB, 12YB, 12MB and 12CB.

Here, as to the aqueous inks stored in the respective color ink cartridges, at least one of the inks supplied to discharge heads 12KA, 12YA, 12MA and 12CA is the aqueous ink relating the exemplary embodiment, and it is preferred that all of the inks supplied to discharge heads 12KA, 12YA, 12MA and 12CA are the aqueous inks relating the exemplary embodiment.

Also, the aqueous inks supplied to discharge heads 12KB, 12YB, 12MB and 12CB may be the aqueous inks relating the exemplary embodiment or may be other known aqueous inks.

The discharge heads 12A and 12B are not limited to the configuration in which four discharge heads corresponding to the respective four colors described above are arranged, and may be a configuration in which four or more discharge heads corresponding to the respective four or more colors including other intermediate colors are arranged.

Herein, each of the discharge heads 12A and 12B may be any of a discharge head (for example, a discharge head of 600 dpi) for low resolution recording which discharges the aqueous ink in a range of an ink droplet volume front 1 pl to 15 pl and a discharge head (for example, a discharge head of 1,200 dpi) for high resolution recording which discharges the aqueous ink in a range of an ink droplet volume less than 10 pl. Also, each of the discharge heads 12A and 12B may be provided with both the discharge head for low resolution recording and the discharge head for high resolution recording.

The ink droplet volume from each of the discharge heads 12A and 12B is in a range of the maximum droplet volume of aqueous ink. Also, dpi means "dot per inch".

In the image-recording unit 10, on the downstream side of the paper convey direction relative to the discharge bead 12A, for example, a drying drum 14A (one example of drying device) on which the rear surface of the recording medium P is wounded and the image (ink) on the front surface of the recording medium is dried while driven-rotating in contact with the recording medium P is arranged.

Similarly, in the image-recording unit 10, on the downstream side of the paper convey direction relative to the discharge head 12B, for example, a drying drum 14B (one example of drying device) on which the front surface of the recording medium P is wounded and the image (ink) on the rear surface of the recording medium is dried while driven-rotating in contact with the recording medium P is arranged.

Also, a convey roller 18 which contacts with the recording medium P is arranged on the downstream side of the paper convey direction relative to the drying drum 14A and the upstream side of the paper convey direction relative to the discharge head 12B.

In the inside of each of the drying drums 14A and 14B, a heating source (for example, a halogen heater: not shown) is integrated. The drying drum 14A and the drying drum 14B dry the image (ink) on the front surface of the recording medium P and the image (ink) on the rear surface of the recording medium P with heating by the heating sources, respectively.

On the periphery of the drying drums 14A and 14B, warm air blowing devices 16A and 16B (one example of drying device) for drying the image (ink) on the recording medium P are arranged respectively. The image (ink) on the front surface of the recording medium P wounded on the drying drum 14A and the image (ink) on the rear surface of the recording medium P wounded on the drying drum 14B are dried with the warm air by the warm air blowing devices 16A and 16B, respectively.

In the case of using the drying device conducting the drying by heating as described above, the drying conditions are preferably as follows.

Specifically, for example, the temperature of the heating source of the drying drum and the temperature of the warm air of the warm air blowing device is preferably in a range from 40° C. to 120° C., more preferably in a range from 60° C. to 100° C., from the standpoint of enhancing the drying of the aqueous ink and suppressing deformation of the recording medium P.

The drying temperature conditions may be the same or different from each other between the drying drum 14A and the drying drum 14B or between the warm air blowing device 16A and the warm air blowing device 16B.

Herein, the drying devices in the image-recording unit 10 have the same constitution in that for the front surface of the recording medium P (the drying drum 14A and the warm air blowing devices 16A) and in that for the rear surface of the recording medium P (the drying drum 14B and the warm air blowing devices 16B), but the constitution is not limited thereto and constitutions different from each other may be used.

In the image-recording unit 10, other drying devices, for example, an infrared heater (not shown) or a laser irradiation equipment for dying the image (ink) on the underlayer of the recording medium P may be arranged on the downstream side of the paper convey direction relative to the discharge heads 12A and 12B, respectively. The other drying devices, for example, an infrared heater or a laser irradiation equipment may be arranged in place of at least one of the drying drams 14A and 14B and the warm air blowing devices 16A and 16B, or may be arranged in addition to the drying drums 14A and 14B and the warm air blowing devices 16A and 16B.

The pre-treatment unit 20 is provided with a supply roll 20A on which the recording medium P supplying to the image-recording unit 10 is wounded, and the supply roll 20A is rotatably supported on a frame member not shown.

In the buffer unit 30, for example, a first pass roller 30A, a dancer roller 30B and a second pass roller 30C are arranged along the paper convey direction. The dancer roller 30B controls tension of the recording medium P conveying to the image-recording unit 10 and the convey amount of the recording medium P by moving up to down in FIGURE.

The post-treatment unit 40 is provided with a winding roll 40A as one example of the convey unit for winding the recording medium P on which the image has been recorded. The winding roll 40A rotates by receiving a rotation force from a motor not shown, whereby the recording medium P is conveyed along the convey route R.

In the buffer unit 50, for example, a first pass roller 50A, a dancer roller 50B and a second pass roller 50C are arranged along the paper convey direction. The dancer roller 50B controls tension of the recording medium P discharged to the post-treatment unit 40 and the convey amount of the recording medium P by moving up to down in FIGURE.

In the cooling unit 60, a plurality of cooling rollers 60A are arranged. By conveying the recording medium P between a plurality of cooling rollers 60A, the recording medium P is cooled.

Herein, the recording speed in the recording apparatus relating to the exemplary embodiment, that is, the conveying speed of the recording medium is not particularly limited, and it may be high speed of 10 m/min or more because the drying device for drying the aqueous ink discharged on the recording medium is provided as described above.

Next, the behavior (recording method) by the recording apparatus 100 relating to the exemplary embodiment will be described.

In the recording apparatus 100 relating to the exemplary embodiment, first, the recording medium P is conveyed from the supply roll 20A of the pre-treatment unit 20 to the image-recording unit 10 through the buffer unit 50.

Next, in the image-recording unit 10, the aqueous ink is discharged from each of the discharge heads 12A on a front surface of the recording medium P. Then, the image (ink) on the front surface of the recording medium P is dried from the rear surface side (the opposite surface to the surface on which the ink has been discharged from the discharge head 12A) of the recording medium P by the drying drum 14A. Further, the ink (image) discharged on the front surface of the recording medium P is dried from the front surface side (the surface on which the ink has been discharged from the discharge head 12A) of the recording medium P by the warm air blowing device 16A. That is, the aqueous ink discharged on the front surface of the recording medium P is dried by the drying drum 14A and the warm air blowing device 16A.

Then, the image recorded on the front surface of the recording medium P is subjected to static electricity removal through the image by contacting the convey roller 18.

Subsequently, in the image-recording unit 10, the aqueous ink is discharged from each of the discharge heads 12B on a rear surface of the recording medium P. Then, the image (ink) on the rear surface of the recording medium P is dried from the front surface side (the opposite surface to the surface on which the ink has been discharged from the discharge head 12B) of the recording medium P by the drying drum 14B. Further, the ink (image) discharged on the rear surface of the recording medium P is dried from the rear surface side (the surface on which the ink has been discharged from the discharge head 12B) of the recording medium P by the warm air blowing device 16B. That is, the aqueous ink discharged on the rear surface of the recording medium P is dried by the drying drum 14B and the warm air blowing device 16B.

Next, in the cooling unit 60, the recording medium P on both surfaces of which the images has been recorded is cooled by the cooling roller 60A.

Then, the recording medium P on both surfaces of which the images have been recorded is passed through the buffer unit 50 and wounded by the winding roll 40A in the post-treatment unit 40.

The images with the aqueous ink are recorded on the both surfaces of the recording medium P through the steps described above.

The recording medium P having the images recorded as described above is cut into the intended size through a step of cutting.

As to the recording apparatus 100, a system in which the droplets of the aqueous ink is directly discharged on the surface of the recording medium P by the discharge heads 12A and 12B is described, but the system is not limited thereto and, for example, a system may be used in which after discharging droplets of the aqueous ink on an intermediate transfer member, the droplets of the aqueous ink on the intermediate transfer member are transferred to the recording medium P.

Also, the recording apparatus 100 has the constitution wherein the discharge head 14A and the recording apparatus (the drying drum 14A and the warm air blowing device 16A) for the front surface of the recording medium P, and the discharge head 14B and the recording apparatus (the drying drum 14B and the warm air blowing device 16B) for the rear surface of the recording medium P are all provided in the image-recording unit 10, but the constitution is not limited thereto. For example, the recording apparatus relating to the exemplary embodiment may have a constitution wherein two image-recording units are provided, and in one image-recording unit the discharge head 14A and the recording apparatus (the drying drum 14A and the warm air blowing device 16A) for the front surface of the recording medium P are provided and in the other image-recording unit the discharge head 14B and the recording apparatus (the drying drum 14B and the warm air blowing device 16B) for the rear surface of the recording medium P are provided.

Also, as to the recording apparatus 100 relating to the exemplary embodiment, a system in which the aqueous ink is discharged on the recording medium P (so-called continuous paper) of roll form and the image is recorded through the drying but, for example, a system may be used in which the aqueous ink is discharged on a sheet paper of the intended size and the image is recorded through the drying.

(Recording Medium)

As the recording medium for use in the recording apparatus and recording method relating to the exemplary embodiment, a known recording medium for image recording, for example, plain paper or coated paper is exemplified.

In particular, from the standpoint of ease of charging and ease of exhibition of the effect of the aqueous ink relating to the exemplary embodiment, a coated paper provided with a coated layer composed of a coating material, a synthetic resin or the like on one surface or both surfaces of a paper substrate is preferably used.

As the coated paper, for example, "OK TOPCOAT+" produced by Oji Paper Co., Ltd. and "AURORACOAT" produced by Nippon Paper Industries Co., Ltd. are exemplified.

The exemplary embodiment described above should not be construed as being limited to the embodiment, and it is needless to say that the realization can be made within the range satisfying the requirements of the invention.

EXAMPLE

The invention is described more specifically with reference to the examples, but the invention is not limited to the examples.

Example 1
[Preparation of Aqueous ink 1]

| | |
|---|---|
| Carbon black (Mogul L produced by Cabot Corp.) (coloring agent) | 5 mass % |
| Sodium neutralized product of styrene/acrylic acid copolymer (polymer dispersant, weight average molecular weight: 30,000) | 2.5 mass % |

-continued

Example 1
[Preparation of Aqueous ink 1]

| | |
|---|---|
| Lubrijet N240 (produced by Lubrizol Corp.) (acrylic emulsion: polymer particle containing acrylic polymer compound having carboxylic acid group, acid value: 65 mgKOH/g, volume average particle size: 0.12 μm, glass transition temperature: 28° C.) | 5 mass % (solid content) |
| Diethylene glycol | 5 mass % |
| Surfactant (Olfine E1010 produced by Nissin Chemical Industry Co., Ltd.) | 2 mass % |
| Ion-exchange water | Remainder (remainder when total ink amount is taken as 100 mass %) |

The composition described above is mixed and then filtered through a filter of 5 μm to obtain Aqueous ink 1.

Example 2

Aqueous ink 2 is prepared in the same manner as in Example 1 expect for substituting Lubrijet N240 (acrylic emulsion) with Plascoat Z-730 (polymer particle containing polyester having carboxylic acid group, produced by Goo Chemical Co., Ltd.) in the preparation of Aqueous ink 1 in Example 1.

Plascoat Z-730 (produced by Goo Chemical Co., Ltd.) is a polyester emulsion, and has an acid value of 40 mgKOH/g, a volume average particle size of 0.08 μm and a glass transition temperature of 46° C.

Example 3

Aqueous ink 3 is prepared in the same manner as in Example 1 expect for substituting Lubrijet N240 (acrylic emulsion) with WBR-2101 (polymer particle containing polyurethane having carboxylic acid group, produced by Taisei Fine Chemical Co., Ltd.) in the preparation of Aqueous ink 1 in Example 1.

WBR-2101 (produced by Taisei Fine Chemical Co.) is a polyurethane emulsion, and has an acid value of 10 mgKOH/g and a volume average particle size of 0.10 μm.

Example 4

Aqueous ink 4 is prepared in the same manner as in Example 1 expect for substituting Lubrijet N240 (acrylic emulsion) with Plascoat Z-760 (polymer particle containing polyester having carboxylic acid group, produced by Goo Chemical Co., Ltd.) in the preparation of Aqueous ink 1 in Example 1.

Plascoat Z-760 (produced by Goo Chemical Co., Ltd.) is a polyester emulsion, and has an acid value of 55 mgKOH/g, a volume average particle size of 0.10 μm and a glass transition temperature of 52° C.

Comparative Example 1

Aqueous ink C1 is prepared in the same manner as in Example 1 expect for not using Lubrijet N240 (acrylic emulsion) in the preparation of Aqueous ink 1 in Example 1.

Comparative Example 2

Aqueous ink C2 is prepared in the same manner as in Example 1 expect for changing the content of Lubrijet N240

(acrylic emulsion) to 20 mass % (solid content) in the preparation of Aqueous ink 1 in Example 1.

Comparative Example 3

Aqueous Ink C3 is prepared in the same manner as in Example 1 expect for substituting Lubrijet N240 (acrylic emulsion) with Plascoat Z-446 (produced by Goo Chemical Co., Ltd.) in the preparation of Aqueous ink 1 in Example 1.

Plascoat Z-446 (produced by Goo Chemical Co., Ltd.) is a polyester emulsion, and has an acid value of less than 5 mgKOH/g, a volume average particle size of 0.10 μm and a glass transition temperature of 47° C.

Comparative Example 4

Aqueous ink C4 is prepared in the same manner as in Example 1 expect for substituting Lubrijet N240 (acrylic emulsion) with Plascoat Z-221 (produced by Goo Chemical Co., Ltd.) in the preparation of Aqueous ink 1 in Example 1.

Plascoat Z-221 (produced by Goo Chemical Co., Ltd.) is a polyester emulsion, and has an acid value of less than 5 mgKOH/g, a volume average particle size of 0.11 μm and a glass transition temperature of 47° C.

(Measurement of Physical Property)

With respect to each of the aqueous inks obtained as above, the possibility of film formation on a glass plate is confirmed by the method described hereinbefore.

In the case where the film formation is possible, the surface resistivity of the film formed is measured by the method described hereinbefore.

The results are shown in Table 1.

(Preparation of Recording Apparatus)

A recording apparatus which has the same constitution as shown in FIGURE, is capable of conducting both surface printing, and is provided with a piezo head of 600 dpi (maximum ink droplet volume: 11 pl) as a discharge head of ink is prepared.

Also, OK TOPCOAT+ (continuous paper, produced by Oji Paper Co., Ltd.) is used as the recording medium P of the recording apparatus.

Details of the recording apparatus are as described below.

Details of Printing Apparatus

Recording speed (recording medium conveying speed): 25 m/min

Preset temperature of drying drum (drying drums 14A and 14B): 100° C.

Preset temperature of warm air blowing device (warm air blowing devices 16A and 16B): 100° C.

The aqueous ink described above is filled in an ink cartridge for K (black) color of the recording apparatus.

Using the recording apparatus, the image recording described below is conducted.

(Image Recording)

Using the recording apparatus described above, the aqueous ink is discharged from the piezo head of 600 dpi (maximum ink droplet volume: 11 pl) on the front surface and the rear surface of the recording medium to form solid images.

Then, drying by the drying drum and the warm air blowing device, and cooling by the cooling roller are conducted.

Through the steps, the image is recorded on the recording medium P using the aqueous ink.

(Measurement of Surface Potential of Recording Medium)

As to the recording medium P in the recording apparatus, the surface potential (surface potential of the rear surface of the recording medium P) in the region just before discharge of the aqueous ink from the discharge head 12KB (the region indicated by arrow X in FIGURE and the region 30 cm away from the discharge head 12KB) is measured using a surface electrometer Model 344 (produced by Trek Japan Co., Ltd.).

The measurement position at which the surface potential of the recording medium (rear surface) P is measured is the place 30 cm away from the tip of the recording medium P in the convey direction.

As the surface potential is small, it is indicated that the recording medium is in the state of less charge (state of further removal of static electricity).

The measurement results are shown in Table 1 below.

(Confirmation of Mist)

At the place adjacent to the discharge head 12KB in the recording apparatus, plain paper of 5 cm×5 cm is attached, and the formation of solid image is continued.

After conducting the formation of solid image for 1,000 m, the plain paper attached is taken out from the recording apparatus and visually observed to confirm the presence or absence and the amount of the mist.

The evaluation criteria are shown below. The measurement results are shown in Table 1 below.

Evaluation Criteria of Image Blurring

A: No generation of mist
B: Some generation of mist
C: Large generation of mist

TABLE 1

| | Possibility of Film Formation | Surface Resistivity of Film Formed (Ω/□) | Surface Potential of Recording Medium (V) | Generation of Mist |
|---|---|---|---|---|
| Example 1 | Possible | $3.0 \times 10^5$ | −30 | A |
| Example 2 | Possible | $2.5 \times 10^5$ | −40 | A |
| Example 3 | Possible | $6.0 \times 10^5$ | −80 | A |
| Example 4 | Possible | $3.0 \times 10^5$ | −50 | A |
| Comparative Example 1 | Impossible | — | — | — |
| Comparative Example 2 | Possible | $2.0 \times 10^6$ | −300 | B |
| Comparative Example 3 | Possible | $5.0 \times 10^6$ | −800 | C |
| Comparative Example 4 | Possible | $3.0 \times 10^6$ | −500 | C |

From the results shown above, it can be seen that the aqueous inks of Examples 1 to 4 can decrease the surface potential of the recording medium and also suppress the generation of mist in comparison with the aqueous inks of Comparative Examples 2 to 4.

Since the aqueous ink of Comparative Example 1 does not contain the polymer particle, a film cannot be formed on the glass plate so that the surface resistivity cannot be measured.

What is claimed is:

1. An aqueous ink which comprises:
   a coloring agent,
   a polymer particle,
   water, and an aqueous organic solvent,
   wherein a surface resistivity of a film obtained by film formation on a glass plate is $1 \times 10^6$ Ω/□ or less.

2. The aqueous ink as claimed in claim 1,
   wherein the polymer particle contains a polymer compound having an acid value of 10 mgKOH/g or more.

3. The aqueous ink as claimed in claim 1,
   wherein the polymer particle contains a polymer compound having at least one of a sulfonic acid group and a carboxylic acid group.

4. The aqueous ink as claimed in claim 2,
wherein the polymer compound is a polyester.
5. The aqueous ink as claimed in claim 2,
wherein the polymer compound is a polyurethane.

\* \* \* \* \*